INVENTOR.
EDWARD F. ADAMS
BY Richard N. Wardell
ATTORNEY

United States Patent Office

3,541,193
Patented Nov. 17, 1970

---

3,541,193
COOLING A SINTERED REFRACTORY CONTAINING UNSTABILIZED ZIRCONIA THROUGH A DISRUPTIVE CRYSTAL PHASE INVERSION
Edward F. Adams, Corning, N.Y., assignor, by mesne assignments, to Corhart Refractories Company, a corporation of Delaware
Filed Aug. 21, 1967, Ser. No. 662,018
Int. Cl. C04b *33/32, 35/48*
U.S. Cl. 264—66                                        9 Claims

ABSTRACT OF THE DISCLOSURE

Green ceramic bodies in the system $ZrO_2$-$Al_2O_3$-$SiO_2$, in which $ZrO_2$ is the major component, cannot readily be fired to crack-free sintered refractory products of practical size because of thermally induced changes of the crystal habit of zirconia. A method of cooling fired bodies from the sintering temperature is disclosed which obviates the difficulty. The method involves control of cooling rate and providing at least one holding period during which fired bodies are maintained within a definite temperature range.

CROSS-REFERENCE TO RELATED APPLICATION

Copending application, Ser. No. 661,999, filed on even date herewith by Edward F. Adams, George D. McTaggart and Emmerson K. Norman, discloses and claims glass-contacting refractory bodies of high zirconia content made by method of present invention.

BACKGROUND OF THE INVENTION

As shown in the above mentioned copending application, sintered refractory bodies of certain compositions in the system, $ZrO_2$-$Al_2O_3$-$SiO_2$, $ZrO_2$ being the major constituent, are particularly suitable for applications involving contact with molten glass. The characteristics which render them thus particularly suitable are low corrosion rate, low stoning potential and minimal penetration of these bodies by molten glass. They are adapted to use at high temperatures for extended periods of time; they do not discolor the glass. Accordingly, they offer two economic advantages to the glass maker; long service life as tank linings, which extends the period of time from first installation to rebuilding of the tank, and the maintenance of product quality.

Despite these manifest advantages, it has heretofore not been possible to manufacture sintered refractory blocks of high zirconia content and of sufficiently large size to be practically useful. The reason for this, of course, is to be found in the thermal behavior of zirconia.

In shaped, sintered zirconia-alumina-silica refractory bodies, a relatively high content of zirconia is desired because of the ability of this material to enable such bodies to meet the requirements of the higher use temperatures desired. Furthermore, the alumina of such a refractory body slowly dissolves in the molten glass particularly at high use temperature. Accordingly, if the alumina content is raised at the expense of the zirconia content, the refractory body tends to exhibit a high stoning potential. In addition, the gradual dissolving of the alumina by the molten glass adversely affects the microstructure of the refractory body which in turn may lead to dimensional changes and early failure in use.

However, the inclusion of a significant quantity of zirconia in a sintered refractory body presents practical difficulties. As is well known, zirconia changes from a monoclinic phase to a tetragonal phase when it is heated to a temperature of approximately 1100° C. The monoclinic phase reforms as the material cools. During this cooling-induced reversion to the monoclinic phase, a volume increase of the zirconia of about 9% occurs. This volume increase occurs within a narrow temperature range and is sufficient to cause fracturing or cracking of the refractory body containing a significant amount of zirconia.

It is known, of course, that a degree of control of this phase inversion of zirconia may be obtained by the addition of other oxides, particularly calcium oxide and magnesium oxides, to the zirconia-containing refractory body. These oxides cause the zirconium to assume a cubic form at high temperatures, which form is retained during cooling. However, when this so-called "stabilized zirconia" is subjected to cyclic heating and cooling, it gradually reverts to the monoclinic phase. This reversion also takes place when a refractory body containing stabilized zirconia is in prolonged contact with molten glass. Furthermore, in compositions containing alumina in addition to stabilized zirconia, reaction will occur between the alumina and the stabilizing oxide. With calcium oxide, alumina forms calcium hexaluminate; with magnesium oxide, the reaction produces magnesium aluminate spinel. Both of these reaction products have an extremely low resistance to corrosion by soda lime glass and hence refractory bodies containing alumina and zirconia so stabilized fail somewhat rapidly in service.

SUMMARY OF THE INVENTION

The present invention provides a method of obtaining high zirconia content sintered refractory bodies, in the system $ZrO_2$-$Al_2O_3$-$SiO_2$, of practically useful size. More specifically it provides a method whereby essentially crack-free large bodies of the type described may be obtained by providing a means of avoiding the adverse effects of the cooling-induced reversion of the tetragonal phase of zirconia to the monoclinic phase. By the practice of the invention it is possible to choose from a wide range of compositions in the system $ZrO_2$-$Al_2O_3$-$SiO_2$ and to obtain therefrom particularly useful glass contacting sintered refractory bodies. This is accomplished, of course, without the necessity of chemically stabilizing the zirconia with the attendant disadvantages of such stabilization.

The invention is particularly directed to the cooling of the sintered refractory body after it has been fired inasmuch as the change in the crystal habit of zirconia which occurs on heating a green body containing it to sintering temperature is not such as ordinarily to lead to fracturing of the body. It will be understood, of course, that, in the firing of any ceramic body, attention must be given to the general relationship between the firing rate and the dimensions of the piece being fired. This is merely to guard against the setting up in the body of undue thermal stresses. Bodies of the compositions to which the present method relates present no unusual difficulties in this respect.

The method of the present invention generally involves precise control of a segment of the cooling cycle following the firing of preforms or green bodies of compositions of high zirconia content in the system described. Particularly upon cooling from the firing or sintering temperature, it involves holding the fired body within a first temperature range of from about 1000° C. to about 1120° C. (preferably from about 1040° C. to about 1100° C.) for a period of time sufficient to permit the temperature of the body to become substantially uniform throughout its mass, thereafter cooling the body, at a rate not in excess of about 10° C. per hour (preferably not in excess of about 5° C. per hour), to a temperature in a second range of about 940° C. to about 990° C., holding the body within this second temperature range for a period of time sufficient to permit its temperature to become substantially uniform throughout its mass and finally allowing the body to cool to a temperature no higher than 900° C., the rate of cooling to the latter temperature being not greater than about 10° C., per hour and preferably not greater than 5° C. per hour. In an alternative, but less desired embodiment, the second holding period, that at the temperature in the second range 990 to 940° C., may be omitted, the body being allowed to cool, at a rate not greater than about 4° C., preferably about 2° C. per hour, from the temperature within the first range of 1000° C. to 1120° C., preferably 1040° C. to 1100° C., to a temperature of no more than 900° C.

As above pointed out, the cooling induced change from the tetragonal to the monoclinic phase of zirconia involves a volume increase in the zirconia of about 9%. It is evident that, if the zirconia is not stabilized against this change, it necessarily occupies a considerably greater volume in a refractory body at ambient temperature than it does in the body at the sintering temperature. This would be true without regard to the conditions under which cooling of the body occurred. Accordingly, it is a particularly unexpected feature of the present invention that, not only can an essentially crack-free high zirconia refractory body be obtained by its practice, but that the body, once produced, may be heated to molten-glass contacting temperature and thereafter cooled to ambient temperature, without cracking, without again conducting the cooling according to the teaching of the invention. It is therefore possible to empty a glassmelting tank constructed of refractory bodies made according to the present invention and to allow it to cool to ambient temperature without undue danger or failure, by cracking, of the refractory bodies involved. In other words, necessary shut-down is not interfered with by the prospect of failure of the refractory bodies. However, as a precautionary measure, it is generally preferable to heat or cool the installed refractory bodies through the range of from about 900° C. to about 1200° C. at a rate of about 5° C. per hour.

It will be understood that the length of horizontal sections A and C as shown are illustrative only. As previously indicated the length of time at which the cooling fired bodies are maintained within the indicated temperature ranges depends, in large measure, on the size and dimensions of the bodies.

DESCRIPTION OF PREFERRED EMBODIMENT

Figure 1:
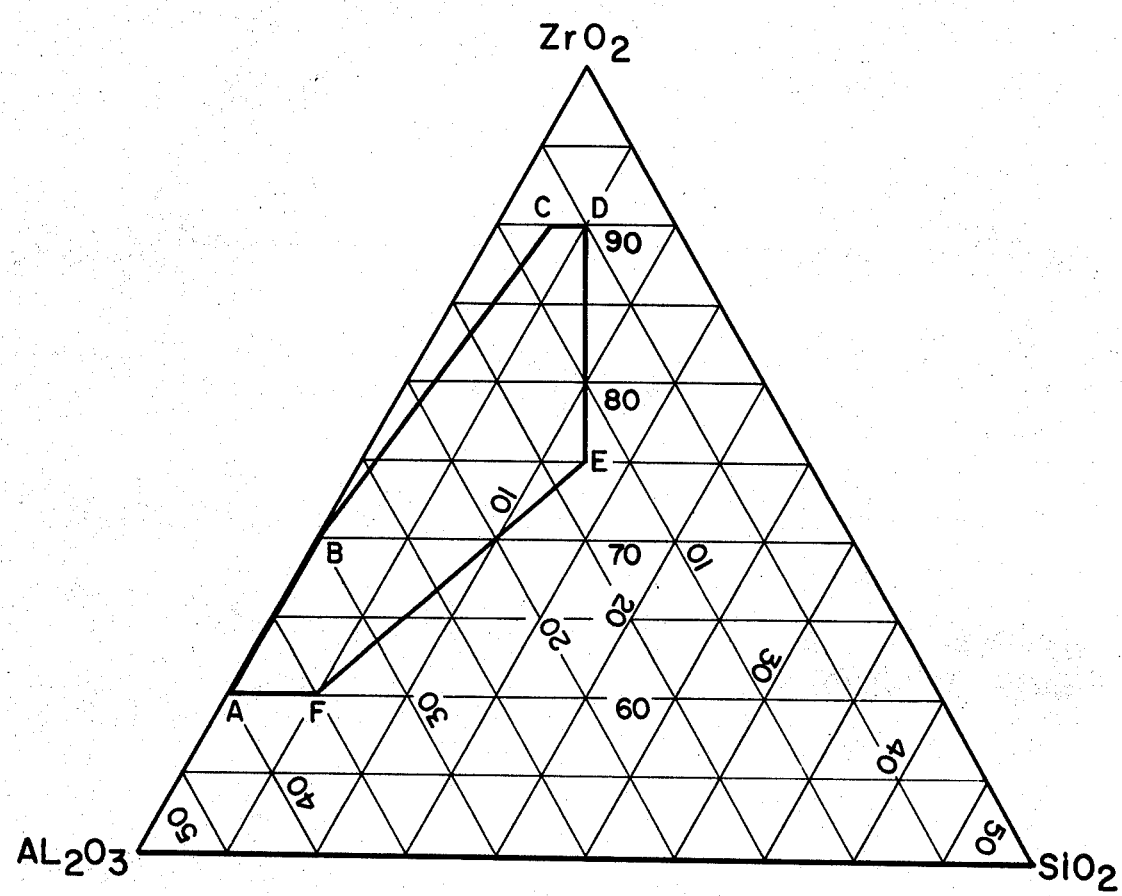
In FIG. 1 of the accompanying drawings, the compositions from which practically useful sintered refractory products can be obtained by the method of the present invention are defined. These compositions fall within the area formed by joining points A, B, C, D, E and F. It will be noted that $ZrO_2$ is the major component of all the defined compositions.
Figure 2:
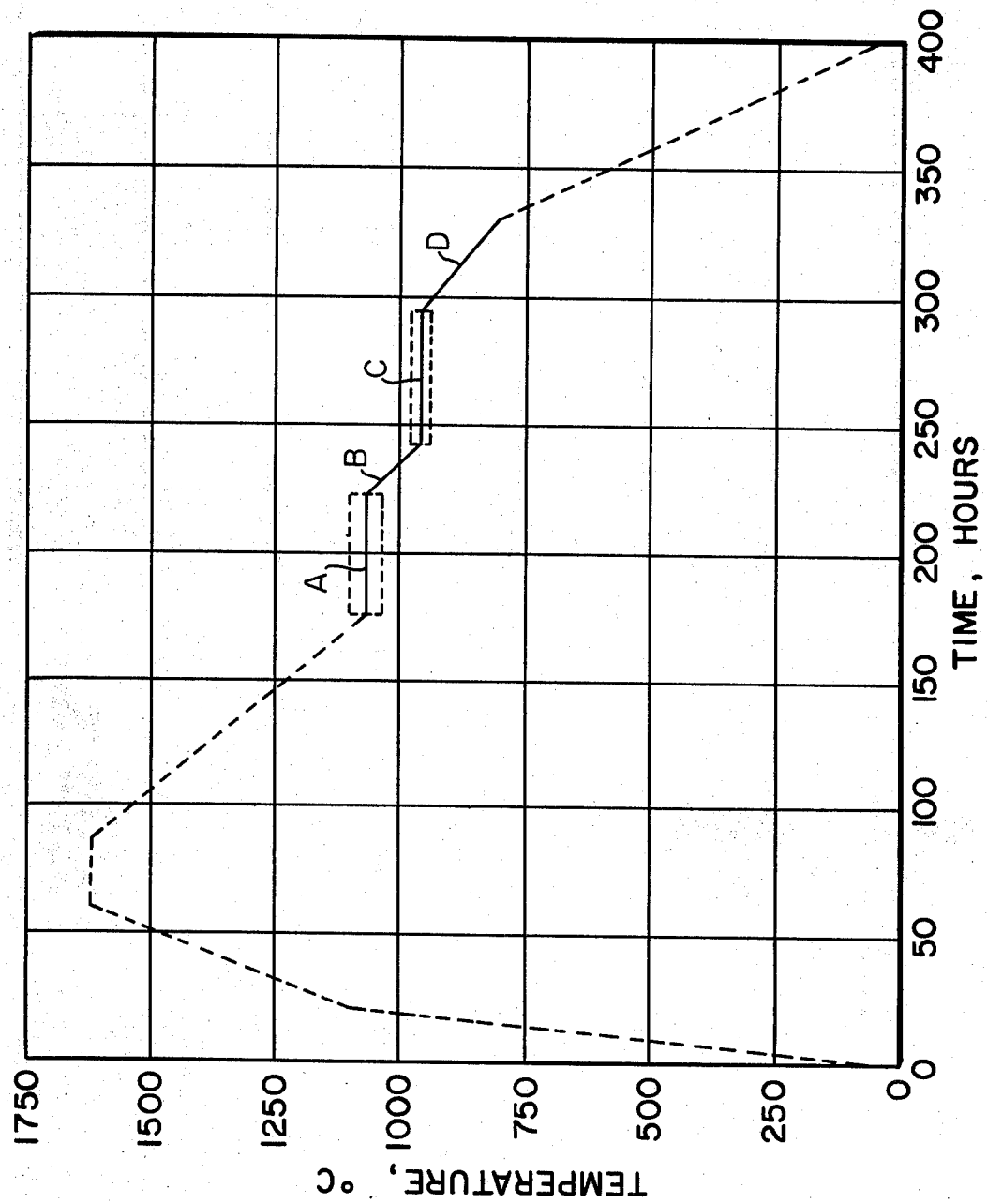
FIG. 2 of the drawings is a graphical representation of the time-temperature relationship in a typical firing schedule for compositions as above defined. The solid line portion of the curve indicates the particular segment of the cooling cycle with which the invention is concerned. The horizontal sections A and C indicate holding periods. The upper and lower sides of the rectangles enclosing sections A and C indicate the preferred temperature range during each holding period. Sloping line sections B and D define cooling rates.

Shaped green blocks of various sizes were prepared from batch mixtures having the compositions given in Table I, all of which fall within the area defined by the lines connecting points A, B, C, D, E and F of FIG. 1.

TABLE I.—COMPOSITION OF BATCH MIXTURES, WT. PERCENT

|  | M | N | O | P | Q |
|---|---|---|---|---|---|
| $ZrO_2$ | 64.8 | 69.9 | 74.9 | 79.9 | 85 |
| $Al_2O_3$ | 28.9 | 24.2 | 19.4 | 14.7 | 10 |
| $SiO_2$ | 4.8 | 4.7 | 4.6 | 4.5 | 4.4 |
| $TiO_2$ | 0.9 | 0.7 | 0.6 | 0.4 | 0.2 |
| $Fe_2O_3$ | 0.4 | 0.3 | 0.3 | 0.2 | 0.1 |
| CaO | 0.2 | 0.2 | 0.2 | 0.3 | 0.3 |

The raw materials employed in the preparation of the above batch mixtures were Demerara bauxite and a commercially available fused zirconia grain. The bauxite, the principal alumina source, conformed to the following analysis by weight: $Al_2O_3$, 89.46%, $SiO_2$, 6.02%; $TiO_2$, 2.98%; $Fe_2O_3$, 1.53%; $ZrO_2$, 0.82%; MgO, 0.13%; CaO, 0.06%. The fused zirconia grain contained, by weight: $ZrO_2$, 83.90%; $Al_2O_3$, 10.68%; $SiO_2$, 4.52%; CaO, 0.68%; $Fe_2O_3$, 0.16% and $TiO_2$, 0.04%.

The bauxite as received was in the form of large lumps of diameter up to 2 inches. These were crushed to a size suitable for brick pressing and the crushed material was mixed with 1.76 parts of soda ash per 100 pounds of the bauxite. This mixture was pressed into brick shapes which were fired to 1450° C. to effect densification of the bauxite grain. The purpose of the soda ash inclusion was to inhibit mullite formation, mullite being less resistant to corrosive attack by molten glass than corundum.

The calcined bauxite was then crushed and milled in a Majac fluid energy mill to a Fisher apparent particle size (APS) of 1.3 microns. The fused zirconia grain was similarly milled to two size fractions, one having a Fisher APS of 1.5 and the other a Fisher APS of 5.0.

A grog was prepared by intimately mixing the milled bauxite and the milled zirconia grain, the latter consisting of equal amounts of the two fractions having Fisher APS values of 1.5 and 5.0, and firing the mixture to 1650° C. The resulting dense mixture was then crushed and screen classified. The bauxite and zirconia grain were, of course, used in such amounts that the grog had the same analysis as the final composition in which it was contained.

EXAMPLE 1

Illustrative of the batch compositions employed is that for batch M of Table I:

Material: Weight, lbs.
  Demerara bauxite, APS 1.3 _____ 48
  Fused zirconia grain, APS 1.5 _____ 76
  Fused zirconia grain, APS 5.0 _____ 76
  Grog, −28 +48 mesh Tyler _____ 50

To the above batch (250 pounds) there were added 17 pounds of a 7% by weight solution of commercial fish oil in toluene. This mixture was blended in a revolving drum for 24 hours and was then cast into porous molds measuring 6″ x 12″ x 18″, 2″ x 4″ x 14″ and 3″ x 9″ x 18″. The resulting blocks were then dried to remove all toluene, after which they were fired according to schedules of which the following is representative:

Firing schedule
(a) RT to 1100° C.—50° C./hr.
(b) Hold at 1100° C.—12 hrs.
(c) 1100° C. to 1650° C.—15° C./hr.
(d) Hold at 1650° C.—24–36 hrs.
(e) 1650° C. to 1040° C.–1100° C.—6° C./hr.
(f) Hold at 1040° C.–1100° C.—48 hrs.
(g) 1040 C.–1100° C. to 950° C.–990° C.—4–6° C./hr.
(h) Hold at 950° C.–990° C.—54 hours
(i) 950 C.–990° C. to 800° C.—5° C./hr.
(j) 800° C. to RT—10° C./hr.

The resulting fired blocks were of excellent quality, being completely free of cracks. They had a density of 4.32 gms./cc. and an apparent porosity of 0.6%.

EXAMPLE 2

In the preparation of a number of blocks measuring 2" x 4" x 12", the hold at 1100° C. during the heating portion of the firing schedule in Example 1 was omitted. In this case, the furnace was heated from 1100° C. to 1650° C. at the rate of 15° C. per hour. Completely satisfactory fired blocks were obtained.

In this example, the compositions contained $ZrO_2$, $Al_2O_3$ and $SiO_2$, in that order, in the following percentages by weight: 90–5–5, 85–10–5, 75–23–2, 65–35–0 and 65–25–10.

EXAMPLE 3

A large number of blocks of various sizes were prepared as described and successfully fired according to the firing schedule given in Example 1. Most of these blocks were of composition M, but all compositions given in Table I are represented in Table II below.

TABLE II

| Block size, inches | No. of good blocks | No. of cracked blocks |
| --- | --- | --- |
| 2 x 4 x 6 | 12 | 0 |
| 2 x 4 x 14 | 55 | 3 |
| 4 x 4 x 14 | 1 | 0 |
| 3 x 9 x 18 | 6 | 1 |
| 6 x 12 x 18 | 2 | 0 |

EXAMPLE 4

A number of blocks of various compositions in Table I were fired according to the schedule given in Example 1 with step (f) of that schedule, the hold in the range of 1040–1100° C., omitted. In this firing the furnace was cooled at a rate of 4.5° C. per hour from 1420° C. to 975° C. Table III, below, shows the result of omitting the holding period in the indicated temperature range.

TABLE III

| Block size, inches | No. of good blocks | No. of cracked blocks |
| --- | --- | --- |
| 2 x 4 x 14 | 0 | 3 |
| 3 x 9 x 18 | 0 | 2 |
| 4 x 12 x 18 | 0 | 2 |

EXAMPLE 5

Three green blocks measuring 3" x 9" x 18" were prepared from compositions M, two blocks, and O, one block. These were fired according to the schedule given in Example 1 but omitting step (h), the hold in the range of 950–990° C. In this firing the furnace was cooled at 4° C. per hour from 1040° C. to 880° C. One block was uncracked. The other two were cracked but were considered acceptable inasmuch as only small, feather cracks were observed, rather than the deep, wide cracks which render a block unfit for installation in a glass melting tank.

EXAMPLE 6

Three firings involving variations of the previously set-out schedule in Example 1 were carried out. In the first firing, the furnace was cooled at a rate of 10° C. per hour to 1120° C. and held at this temperature, which is 20° C. above the upper temperature of the preferred range of 1040° C. to 1100° C., for 19 hours. In the second firing, the furnace was cooled from 1650° C. to 1000° C., at which temperature it was maintained for 49 hours. The cooling rate was 15° C. per hour. This hold was 40° C. below the lower temperature of the preferred range of 1040° C. to 1100° C. Finally, in the third firing the furnace was cooled from 1040° C., at the rate of 4° C. per hour, to 900° C., at which temperature it was maintained for about 50 hours. This hold was 40° C. below the lower temperature of the preferred range of 940° C. to 990° C. The combined results of these three firings are shown in Table IV.

TABLE IV

| Size, inches | Percent $ZrO_2$ | No. of good blocks | No. of cracked blocks |
| --- | --- | --- | --- |
| 2 x 4 x 14 | 65 | 7 | 0 |
| 2 x 4 x 14 | 80 | 1 | 0 |
| 2 x 4 x 14 | 85 | 1 | 0 |
| 3 x 9 x 18 | 65 | 4 | 0 |
| 3 x 9 x 18 | 80 | 2 | 0 |
| 3 x 9 x 18 | 85 | 2 | 0 |
| 6 x 12 x 18 | 65 | 0 | 3 |

Of the three 6" x 12" x 18" blocks, one each was included in each of the above described firings. The example indicates that for relatively small blocks, some variation from the normal firing schedule may be tolerated.

EXAMPLE 7

Completely satisfactory, crack-free blocks of practical size were made from a variety of compositions by employing the firing schedule in Example 1. Representative compositions, consisting essentially of $ZrO_2$, $Al_2O_3$ and $SiO_2$, contained these components, in the order listed, in the following percentages by weight: 60–30–10, 60–40–0, 65–20–15, 75–15–10, 75–24–1, 85–10–5, 85–13–2 and 90–5–5.

From the foregoing, it is apparent that the present invention provides a practical method for the production of sintered, ceramic, essentially crack-free refractory blocks of high $ZrO_2$ content in the system $ZrO_2$-$Al_2O_3$-$SiO_2$.

I claim:
1. In the method of making a sintered refractory body having monoclinic zirconia as the major component, said method comprising
   forming a green body consisting essentially of a composition defined by the area delineated by the lines connecting points A, B, C, D, E and F of FIG. 1 of the accompanying drawing,
   firing said green body at sintering temperature that yields the sintered body with tetragonal zirconia as the major component thereof and
   thereafter cooling said sintered body whereby the tetragonal zirconia changes to monoclinic zirconia,
   wherein the improvement comprises
   interrupting the cooling of the sintered body at a temperature within a first temperature range of from about 1000° C. to about 1120° C.,
   maintaining the sintered body at a temperature within said first temperature range during a first holding period of sufficient duration to permit the sintered body to attain a substantially uniform temperature throughout its mass,
   cooling the sintered body at a rate not in excess of 10° C. per hour to a temperature within a second temperature range of from about 940° C. to about 990° C.,
   maintaining the sintered body at a temperature within the second temperature range during a second holding period of sufficient duration to permit the sintered body to attain a substantially uniform temperature throughout its mass, and thereafter cooling the sintered body to a temperature no higher than 900° C. at a rate not in excess of 10° C. per hour.

2. The method of claim 1 wherein the rate of cooling of the sintered body from a temperature within the first temperature range to a temperature within the second temperature range is not in excess of 5° C. per hour.

3. The method of claim 1 wherein the first temperature range is from about 1040° C. to about 1100° C.

4. The method of claim 2 wherein the first temperature range is from about 1040° C. to about 1100° C.

5. The method of claim 4 wherein the rate of cooling of the sintered body from a temperature within the second temperature range to a temperature no higher than 900° C. is not in excess of 5° C. per hour.

6. In the method of making a sintered refractory body having monoclinic zirconia as the major component, said method comprising forming a green body consisting essentially of a composition defined by the area delineated by the lines connecting points A, B, C, D, E and F of FIG. 1 of the accompanying drawing, firing said green body at sintering temperature that yields the sintered body with tetragonal zirconia as the major component thereof and thereafter cooling said sintered body whereby the tetragonal zonia changes to monoclinic zirconia, wherein the improvement comprises interrupting the cooling of the sintered body at a temperature within a temperature range of from about 1000° C. to about 1120° C., maintaining the sintered body at a temperature within said temperature range during a holding period of sufficient duration to permit the sintered body to attain a substantially uniform temperature throughout its mass, and thereafter cooling the sintered body to a temperature of no more than 900° C. at a rate not in excess of 4° C. per hour.

7. The method of claim 6 wherein said temperature range is from about 1040° C. to about 1100° C.

8. The method of claim 6 wherein the rate of cooling of the sintered body from a temperature within said temperature range to a temperature of no more than 900° C. is not in excess of 2° C. per hour.

9. The method of claim 8 wherein said temperature range is from about 1040° C. to about 1100° C.

References Cited

UNITED STATES PATENTS

| | | | |
|---|---|---|---|
| 2,830,348 | 4/1958 | Busby et al. | 106—57 |
| 2,842,447 | 7/1958 | Schlotzhauer et al. | 106—57 |
| 3,249,449 | 5/1966 | Kiehl et al. | 106—57 |
| 3,393,079 | 7/1968 | Masoero | 106—57 |

OTHER REFERENCES

F. H. Norton, Refractories, 3rd edition, 1949, pp. 187–192 and 195.

F. H. Norton, Refractories, 3rd ed. 1949, pp. 420–436.

S. P. Mitoff et al., "Thermal Strains During Firing of a Ceramic Body," appearing in the April 1954 issue of the Journal of The American Ceramic Society, pp. 168–172.

C. W. Isenhour, Jr., "Cooling In Tunnel Kilns," appearing in the August 1952 issue of Ceramic Bulletin, pp. 274–275.

JULIUS FROME, Primary Examiner

J. H. MILLER, Assistant Examiner

U.S. Cl. X.R.

106—57